G. B. KEPLINGER.
BOTTLE WASHING MACHINE.
APPLICATION FILED AUG. 22, 1910.

1,098,907.

Patented June 2, 1914.
11 SHEETS—SHEET 2.

G. B. KEPLINGER.
BOTTLE WASHING MACHINE.
APPLICATION FILED AUG. 22, 1910.

1,098,907.

Patented June 2, 1914.
11 SHEETS—SHEET 10.

UNITED STATES PATENT OFFICE.

GEORGE B. KEPLINGER, OF CHICAGO, ILLINOIS, ASSIGNOR TO KYLE BOTTLE WASHING MACHINE COMPANY, OF CHICAGO, ILLINOIS, A CORPORATION OF ILLINOIS.

BOTTLE-WASHING MACHINE.

1,098,907. Specification of Letters Patent. Patented June 2, 1914.

Application filed August 22, 1910. Serial No. 578,308.

*To all whom it may concern:*

Be it known that I, GEORGE B. KEPLINGER, a citizen of the United States, residing at Chicago, in the county of Cook and State of Illinois, have invented certain new and useful Improvements in Bottle-Washing Machines, of which the following is a specification.

This invention relates to machines for washing bottles, and in the preferred form comprises a machine capable of handling a relatively large number of bottles at a time, being preferably associated in practice with a mechanism for supplying soiled bottles to the washing machine proper and a draining mechanism for receiving and conveying away the washed bottles.

My improved machine belongs to that type of bottle-washing machines which employ a rotary member provided with a series of radially disposed carriers each equipped with a group or row of bottle-holding devices which engage the bottles at both ends of the latter, the inner series of holders which engage the necks of the bottles including valve-controlled boxes for containing shot or like scouring material. These holders are also provided with injector tubes for directing the water in the form of a jet or spray into the interior of the bottles; and an important feature of the invention consists in a novel manner of and means for directing the injected water and effecting and controlling the scrubbing action of the shot.

Other features of the invention relate to novel means for so positioning the bottles as to secure the most effective cleansing action thereon of the water and shot; to novel means for effecting and controlling the supply of soiled bottles to the machine and the delivery of washed bottles therefrom; to novel means for automatically controlling the water supply; to novel means for automatically trapping the shot in the shot-boxes so as to prevent escape and loss thereof prior to the release and delivery of the cleaned bottles; to novel means for guiding the discharged bottles from the rotary carrier into a delivery conveyer; and to other novel details of structure and relative arrangement of parts all coöperating to the production of an economical and efficient machine for the purpose stated, all as substantially hereinafter described, and more particularly pointed out in the claims.

One practical form in which the invention may be embodied is illustrated in the accompanying drawings, in which—

Fig. 9 is an enlarged elevation, partly broken out and in section and with some details omitted, showing the mechanism for guiding the soiled bottles into the rotary carrier and for delivering the washed bottles from the latter to the drainer, substantially as said parts appear when viewed on the line 9—9 of Fig. 3 looking in the direction indicated by the arrows.

Figure 2:
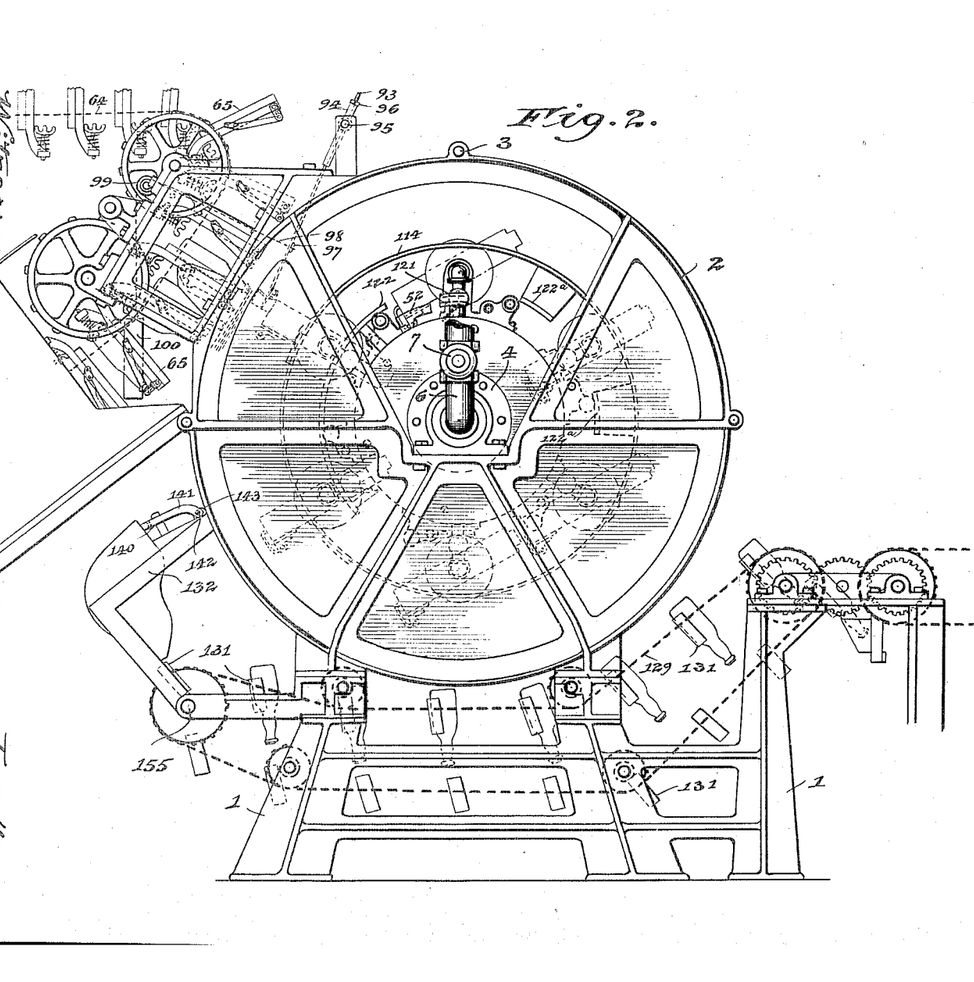
Fig. 2 is a similar view from the opposite side of the machine.
Figure 5:
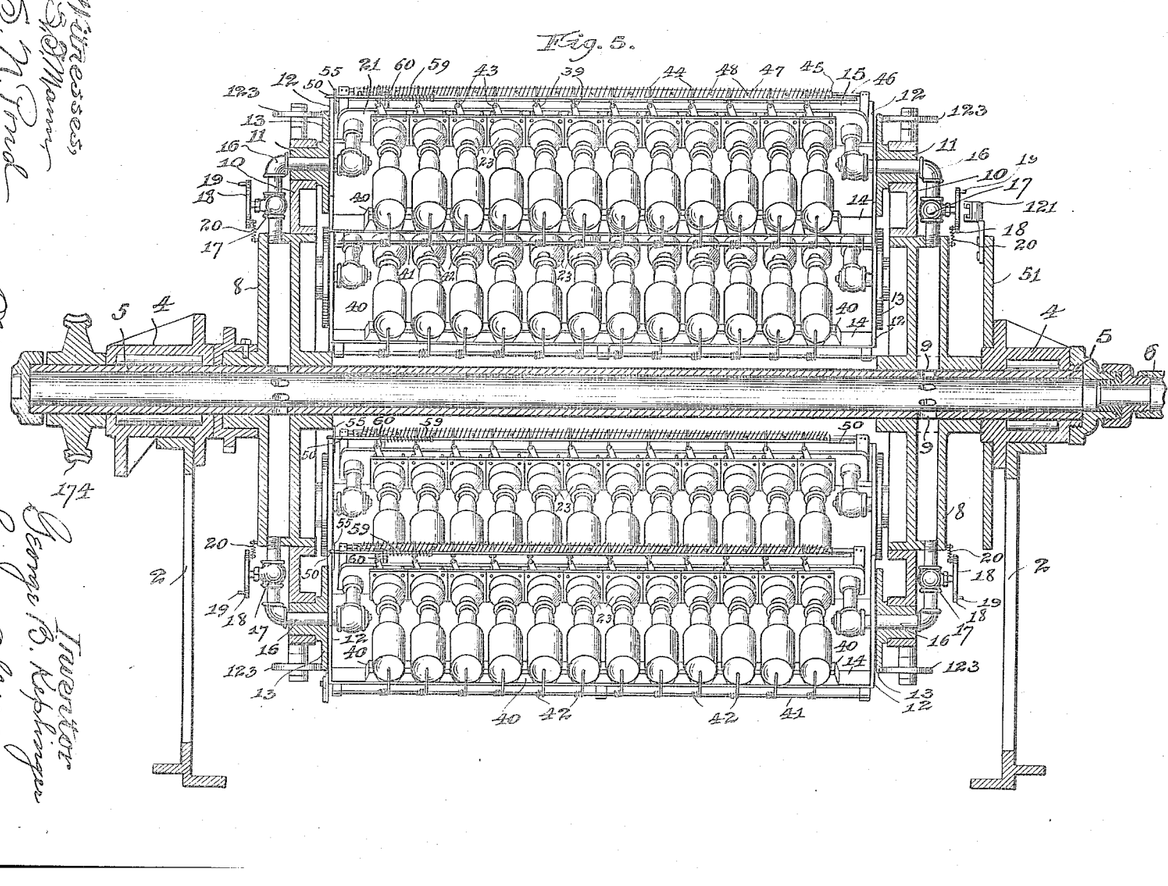
Fig. 5 is a central vertical section through the main rotary bottle-carrying member of the machine, more particularly illustrating the water supply thereto.

Referring to the drawings, 1 designates a supporting base on each side of the machine, secured to and superimposed on which are a pair of circular spider-like side frames 2 radially spaced and connected by tie-rods 3. Journaled in bearings 4 (Fig. 5) carried by the side frames 2 is a rotary tubular shaft 5 with one end of which is connected a water supply tube 6 (Fig. 2) having a manually controlled cock 7.

Figures 10, 11, 12, 13, 14:
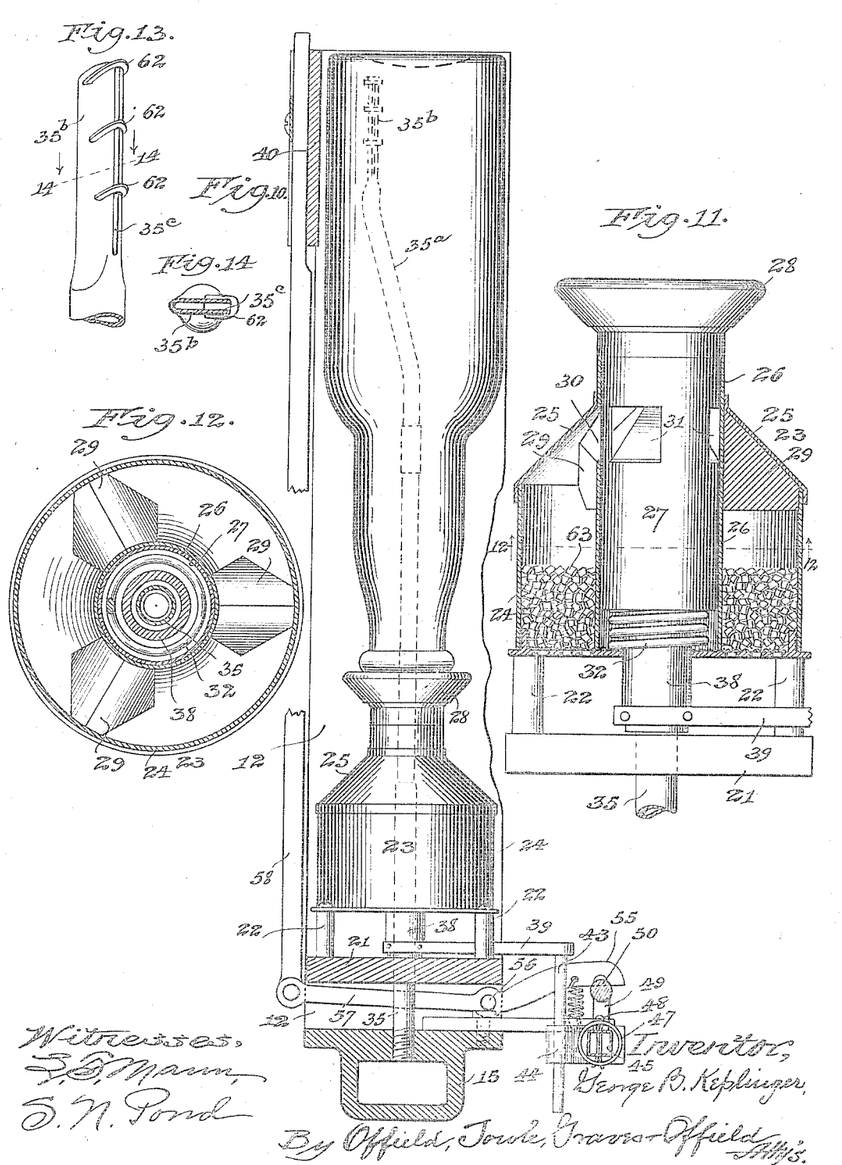
Fig. 10 is an enlarged detail of one of the shot-boxes and bottle clamps showing a bottle engaged therewith, and also showing a portion of the shot valve and controlling mechanism.
Fig. 11 is a vertical sectional view through a shot-box, its coöperating bottle clamp appearing therein in elevation.
Fig. 12 is a transverse section on the line 12—12 of Fig. 11 looking in the direction indicated by the arrows.
Fig. 13 is a detail elevation of the tip of the water-spray tube.
Fig. 14 is a sectional detail on the line 14—14 of Fig. 13, viewed in the direction indicated by the arrows.
Figure 15:
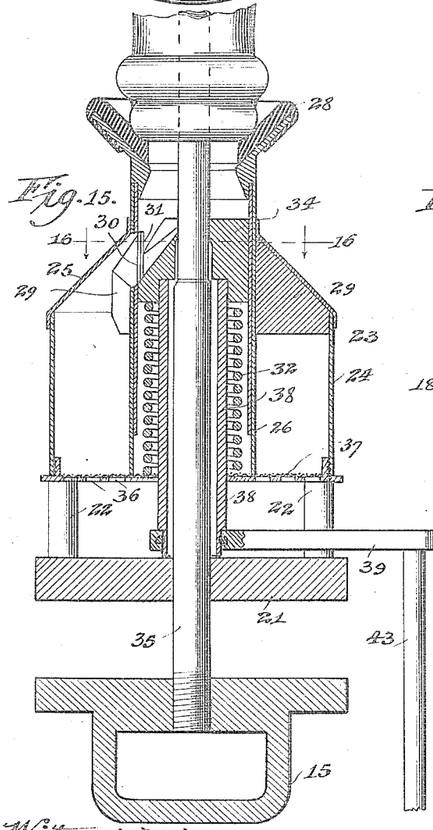
Fig. 15 is a central axial sectional view through a shot-box and its coöperating bottle clamp, showing an open position of the shot valve automatically effected in part by the engagement of the bottle with the clamp.
Figures 16, 18:
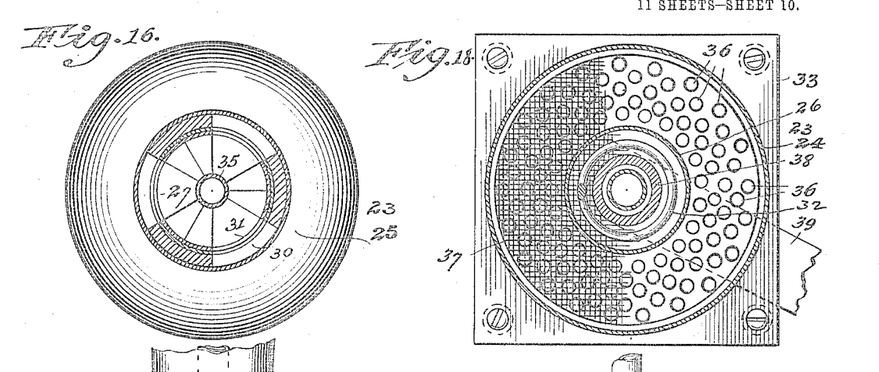
Fig. 16 is a cross section on the line 16—16 of Fig. 15.
Fig. 18 is a cross sectional view on the line 18—18 of Fig. 17 looking in the direction indicated by the arrows.
Figure 17:
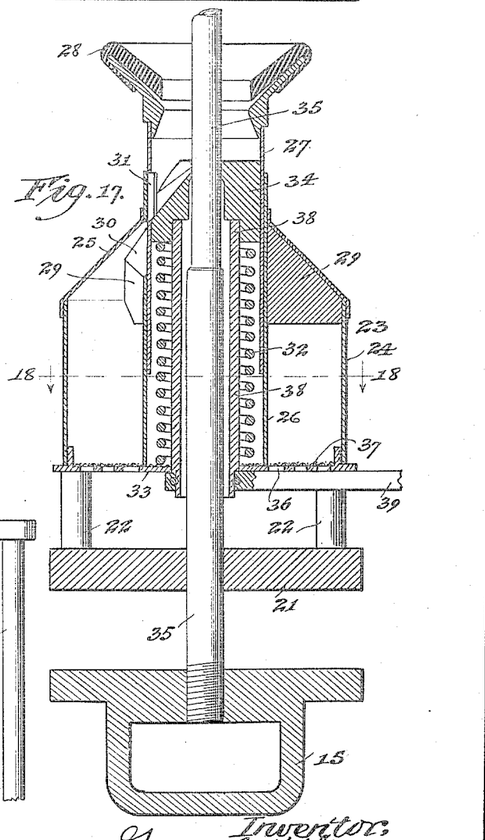
Fig. 17 is a view similar to Fig. 15 showing the outer position of the bottle clamp wherein the shot valve is always closed.

Fast on the tubular shaft 5 inwardly of the side frames are a pair of circular hollow members 8 (Fig. 5) that are in free communication with the interior of the shaft 5 through ports 9; and secured on and extending radially of the latter at equally spaced intervals are brackets 10, in which are journaled the hollow trunnions 11 of a series of pivoted or swinging bottle-carriers equipped with a series of clamps for engaging the bottles at their bottoms and necks. Each of these swinging bottle-carriers comprises a rectangular frame consisting of transverse end bars 12 secured to and rigid with disks 13 integral with the trunnions 11 and parallel longitudinal bars 14 and 15 between said end bars. The bar 15, as more clearly shown in the detail views Figs. 10, 15, and 17, is a hollow casting adapted to transmit the flow of water to the several injector nozzles; the water passing from the chambered members 8 to the hollow bars 15 by a series of pipes 16 (Fig. 5) leading from the members 8 through the hollow trunnions 11 into the chambered bars 15 at both ends of the latter, and equipped with controlling valves 17, the stems of which have disks 18 carrying laterally projecting pins 19 for automatic actuation of said valves as hereinafter described. A contractile spring 20 (Figs. 6 and 7) connected to the valve disk 18 and the stationary water chamber 8 normally maintains said valves open.

Secured to and extending between the transverse end bars 12 and parallel with the hollow side bar 15 of each bottle-carrying frame is a transverse bar 21, on which are mounted by suitable posts 22 a series of shot-boxes 23. These latter, as best shown in the detail views, Figs. 9 to 18 inclusive, comprise essentially cylindrical shells 24 having tapered tops or caps 25 and a central tubular internal sleeve 26 which projects slightly beyond the outer end of the box and forms a guide for the sliding stem or shank 27 of a clamp member, the upper end of which is fitted with a dished rubber socket-piece 28 that engages the end of the neck of the bottle, as clearly shown in Fig. 15. The guide-sleeve 26 is rigidly secured to the inside wall of the shot-box body and cap by ribs 29 (Figs. 11 and 12) the lower sides of which are oppositely beveled as shown in Fig. 12, to facilitate the flow of the shot outwardly between said partitions through ports 30 formed in the sleeve 26. The shanks or stems 27 are formed with ports 31 which, when the member 27 is in its innermost position, as when engaged with a bottle, may register with the ports 30 of the stationary sleeve, as clearly shown in Fig. 15, to permit free flow of the shot between the bottle and shot-box. When, however, the stem or shank 27 is in its outermost position, as shown in Fig. 17, the ports 30 and 31 are out of register. The three ports in both the stationary sleeve 26 and the clamp stem 27 are each of approximately 60 degrees in width, spaced equally apart, so that by turning the clamp stem through 60 degrees when the same is in its innermost position shown in Figs. 11 and 15, the two ports are occluded, and the shot is trapped in the shot-boxes against flowing into the bottles. Hence, it will be seen that the clamp stem is essentially a valve which controls a port for the passage of shot by both a sliding and a rotary movement.

The valve 27 is normally urged outwardly by a spring 32 confined between the bottom plate 33 of the shot-box and a closure-piece 34 set within the tubular valve member 27, the piece 34 being centrally aperatured for slidable engagement with an injector-tube 35 that is mounted in and projects from the hollow water conducting bar 15. The bottom 33 of the shot-box is perforated as shown at 36 for the escape of water and covered by a screen 37 which prevents the escape of shot. Secured to and depending from the plug or filler-piece 34 is a sleeve 38 that projects through the bottom 33 and has secured thereto an arm 39 by which the valve member 27 is actuated in its rotary or turning movement, as hereinafter described. The bodies of the bottles are supportd, during the scouring operation, in saddles 40 secured to and carried by the longitudinal bars 14 of the pivoted bottle-carrying frames; and the bottles are confined in place by devices in the nature of hinged clamps, comprising essentially a rock-shaft 41 journaled parallel with the bar 14 and carrying a series of spring fingers 42 adapted to be swung into and out of engagement with the bases of the bottles, as clearly shown in Fig. 5, and in detail in Figs. 6 and 7.

Referring to the means for actuating the water and shot-controlling valves in the shot-boxes, it may be stated that, when the machine is empty, the valves are normally closed as shown in Fig. 17, the ports 30 and 31 being out of longitudinal alinement. The inward movement of the valve-member caused by the engagement of a bottle therewith, places the valve-member in a position in which registration of the ports 30 and 31 may be effected by a turning movement of the valve-member through 60 degrees, such position being shown in Fig. 15. Just prior to the discharge of the bottles, it is essential to close the valve; and the turning movements of the latter at the proper times to effect the opening and closing of the valve are effected by the following instrumentalities. Projecting laterally from each valve-arm 39 is a rod 43 that is engaged by a clip 44 (Figs. 10 and 19) loosely mounted on and projecting laterally of a square tube 45 slidably mounted on bars 46 at either end. Encircling the tube 45 between adjacent clips 44 are coiled compression-springs 47; and preferably the two halves of each spring are made independent in action by a cotter pin 48 passed through the tube centrally of the spring and constituting an intermediate spring abutment. In case one of the valves should become clogged or get stuck, this feature permits the actuation of the other valves.

Figures 7, 8:
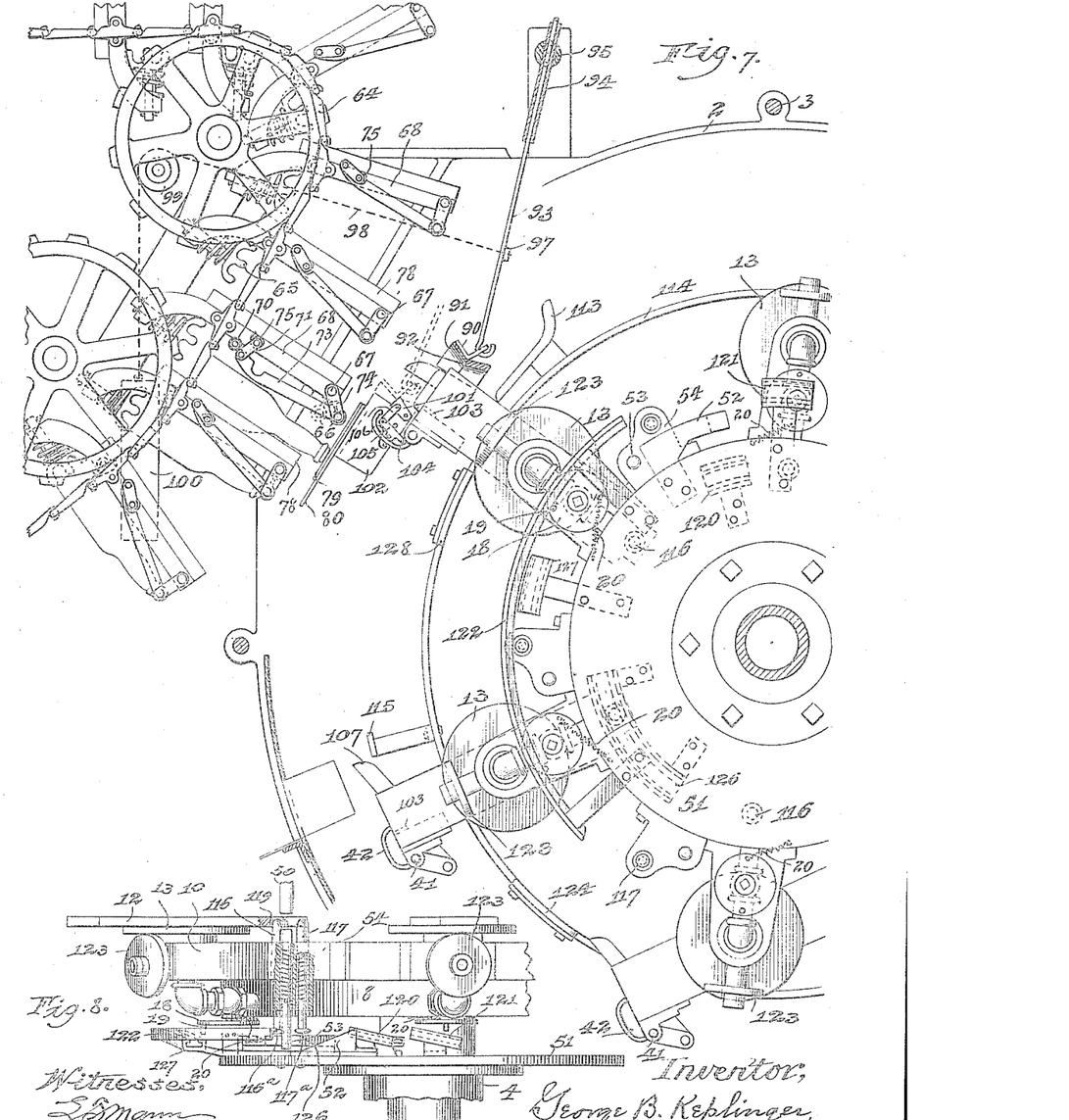
Fig. 7 is a view similar to Fig. 6 from the opposite side of the machine, also showing the stationary cams which release locking devices for holding the pivoted bottle carriers in predetermined positions, another cam which opens the valves of the shot-boxes to permit the free flow of shot between the boxes and the bottles, and another cam which opens and closes the valves controlling the supply of water to the injector tubes.
Fig. 8 is a fragmentary top plan, partly in section, of the right-hand portion of Fig. 7.

To the tube 45 is rigidly secured by connecting pieces 49 an actuating-rod 50, which is shifted longitudinally at the proper time to open the valves by cam-actuated means as follows: Referring to Figs. 7 and 8, 51 designates a stationary disk secured to the inner face of one of the bearings 4, on the inner face of which is a cam 52 over which rides the outer end of a normallly spring-retracted thrust-rod 53 that is slidably mounted in a bracket 54 secured to and carried by the chambered-disk 8. The inner end of the thrust-rod 53 is in longitudinal alinement with the adjacent end of the valve-actuating rod 50; so that as each bottle-carrying frame, after having been loaded with bottles, moves bodily to a position in which the thrust-rod 53 engages the cam 52, the valve-actuating rod 50 is shifted longitudinally, and the several valves are opened. The other end of the rod 50 has a notch 54' (Fig. 9) that is engaged by a spring-actuated latch 55 (Fig. 10) pivoted at 56 to one end of the end bar 12 of the frame and having a tail-piece 57 to which is pivotally connected a rod 58 extending alongside the end bar 12 and projecting slightly beyond the outer end of the latter, as shown in Fig. 10; said rod 58 being struck at the proper time to raise the latch 55 and permit the retraction of the rod 50, and consequently the closing of the valves, by means of a compression-spring 59 (Fig. 5) connected to said rod and abutting against a stationary post 60 on the said frame. Secured in the hollow bar 15, and freely communicating therewith are the series of injector tubes 35 best shown in detail in Figs. 10 to 17 inclusive. The outer portions of these tubes, as shown in Fig. 10, are each laterally off-set by an inclined portion 35$^a$ and terminate in the flattened discharge nozzle 35$^b$ closed at its outer end and formed with a lateral discharge orifice 35$^c$. The passage-way through the discharge nozzle preferably contains a series of deflector-plates 62 (Fig. 13) serving to divide the stream of water and eject it throughout the full length of the discharge orifice. The direction of discharge is oblique and approximately tangential to the wall of the bottle, and as the water is injected under high pressure a rapid whirling action of the water is set up which has the effect of throwing the shot outwardly by centrifugal force into a thorough scouring engagement with the walls of the bottle; square shot being preferably used as indicated at 63 in Fig. 11. The injected water, of course, flows out through the neck and mouth of the bottle into the shot-box, discharging through the perforated bottom wall of the latter, and the pressure of the water during the washing operation, when the bottles are upright, is regulated so as to maintain the shot in a well dispersed condition throughout the length of the bottle; such a pressure as might drive the shot upwardly into the shot-box being avoided, or remedied by intermittent cut-off of the water.

Figure 6:
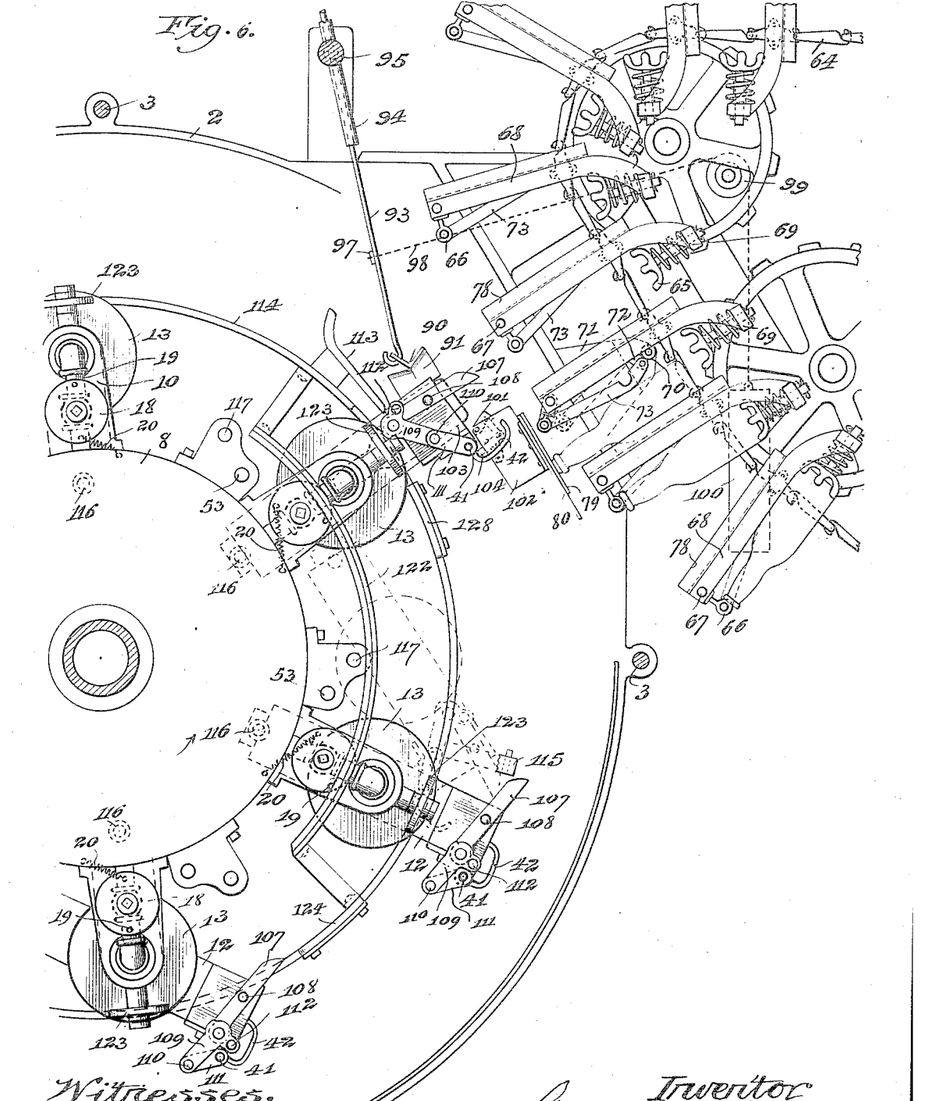
Fig. 6 is an enlarged detail view in side elevation of a portion of the main rotary member and its radially arranged bottle-holding devices, also showing a portion of the delivery conveyer and the means for guiding and controlling the discharge of soiled bottles from the latter to the holders of the rotary carrier and the means for clamping and releasing the bottles in the latter.

The soiled bottles are delivered in rows to the successive bottle-carrying frames from an endless conveyer comprising essentially sprocket chains 64 and a series of bottle-holders carried thereby. These holders, as best shown in Figs. 6, 7, and 9, comprise inner spring-actuated clamps 65 adapted to grip the base of the bottles, and outer clips shown as small eye-bolts 66 carried by and depending from a rock-shaft 67 mounted in the outer ends of end frame-pieces 68 rigidly secured to the chains, the inner ends of said frame pieces 68 also supporting a transverse bar 69 in which are slidably mounted the clamps or grips 65. The clips 66 are swung outwardly to release the bottles at the proper time by the mechanism shown in Figs. 6 and 7 comprising a stationary roller 70 mounted on the face of a bracket 71 carried by the main side frame member, said roller engaging an arm 72 connected by a link 73 with an arm 74 on the rock-shaft 67, the parts being normally maintained in bottle-clamping position by a torsion spring 75 normally tending to swing the arm 72 toward the chain. A pair of parallel strips 76 and 77 (Fig. 9) between the end bars 68 carry a series of saddles 78 into which the bottles fall when released from their clamps, as shown in Fig. 7. As the bottle falls it slides forwardly and strikes at its open end against a plate 79 which is slidable over and relatively to a stationary plate 80 secured to the opposite side frames by strips 81 at either end thereof, as shown in Fig. 9. When a row of bottles is about to be discharged from the feeding-in conveyer to one of the frames of the washing machine, the plate 79 is elevated relatively to the stationary plate 80, as shown in Fig. 9, and at the proper instant it is lowered to allow the bottles to slide over and across the upper edge of the plate 80. The plate 79 is actuated from a cam 82 (Fig. 3) on the main shaft through a push-rod 83, bell-crank lever 84, and link 85 connected to one end of the plate 79. A uniform up and down movement of the plate is secured by a connection which transmits the lifting movement at one end to the other end, comprising pins 86 (Fig. 9) in the plate 79 projecting through arc-shaped slots 87 in the stationary plate 80 and connected to bell-crank levers 88 pivoted to said stationary plate 80, the opposite arms of said bell-crank levers being connected by a link 89.

Figure 3:
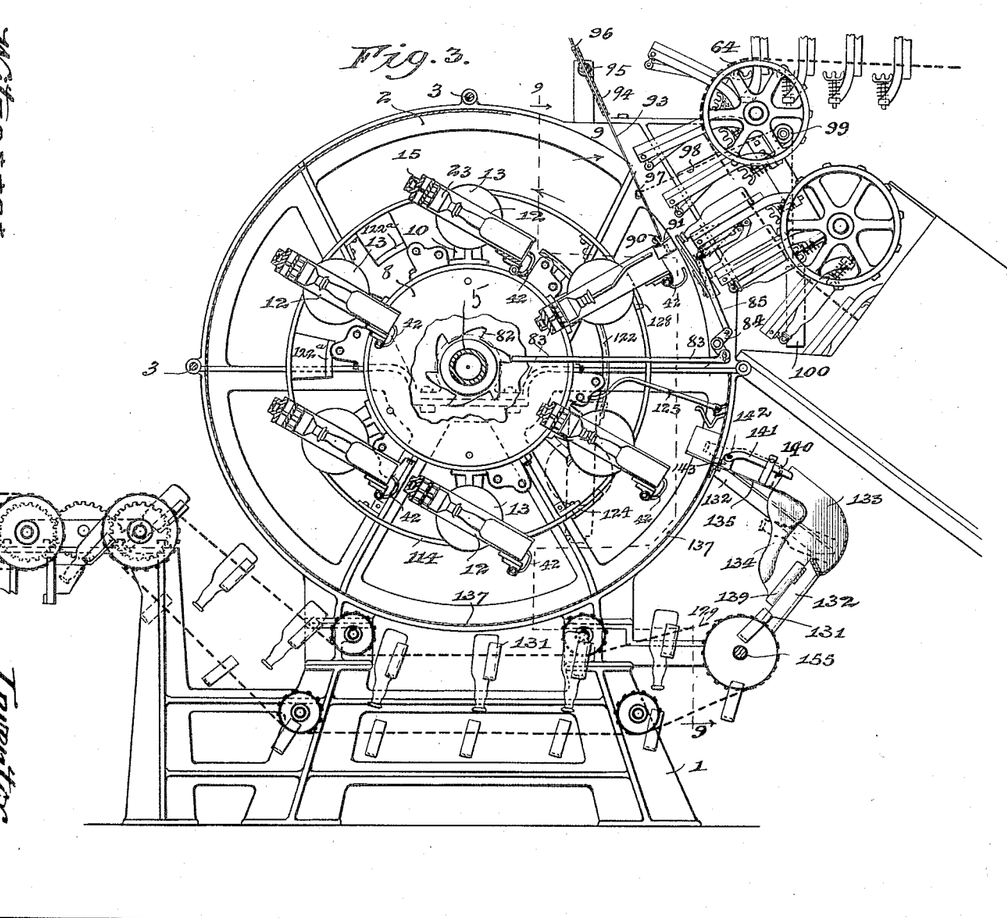
Fig. 3 is a transverse sectional view taken in different planes.

In order to insure the registration of the mouths of the bottles with the injector-tubes 35, I provide a movable centering device or guide herein shown as comprising a transverse bar 90 (Figs. 6, 7, and 9), secured to the underside of which are a series of semi-bell-mouthed guides 91 formed with semi-circular shoulders 92 adapted to engage and center the mouth of the bottle. The bar 90 is suspended from a pair of rods 93 that slidably engage sleeves 94 carried by a pivoted shaft 95 suitably mounted in the frame; the upper ends of the rods 93 carrying adjusting nuts or stops 96 (Fig. 3). The rods 93 are transversely connected above the bar 90 by a strip 97 (Fig. 9) from the ends of which extend cords or chains 98 trained over pulleys 99 on the frame and connected to weights 100. The weights 100 draw the guides 91 over a latch 101 pivoted on a bracket 102 secured to the stationary plate 80, so that the bell-mouthed guides 91 are normally maintained in the position indicated by dotted lines in Fig. 7 ready to receive the neck of a bottle as the plate 79 is moved downwardly. As each bottle-carrying frame moves up to bottle-receiving position, the latch 101 is tripped by the engagement of a lug 103 with the tail-piece 104 of a trip-lever 105 that is connected by a link 106 to the latch 101, and the weight of the bottles overcoming the weights 100 causes the guides to swing with the bottles toward the bottle-carrying frames of the rotary carrier, guiding the mouths of the bottles on to the injector-tubes 35. The rotary carrier has a slow continuous rotary movement, and after a row of bottles has been received, as the latter move upwardly the guide 90 slides off the butt ends of the bottles under the effect of the weights 100, and drops to a position to engage the next row of bottles under its own weight.

After a row of soiled bottles has thus been guided and delivered to a frame of the rotary carrier, the bottles are secured therein by the outer clamps 42 by the following mechanism: Referring to Fig. 6, the rock-shaft 41 carrying the clamp-fingers 42 is provided with an actuating-mechanism consisting of a lever 107 pivoted at 108 to the end member 12 of the swinging-frame, the inner end of said lever being pivoted to an elbow-lever 109 at the elbow of the latter, and the longer arm of said elbow-lever being pivotally connected at 110 to a crank-arm 111 on the rock-shaft 41. Projecting laterally of the short arm of the elbow-lever 109 is a stud or roller 112. This stud 112 is adapted, after the bottles have been received and positioned within the frame, to engage a stationary cam 113 on a stationary ring 114 secured to the circular side frames 2. The engagement of the stud or roller 112 with cam 113 rocks the clamp-actuating mechanism from the open position shown at the upper part of Fig. 6 to the closed or locked position shown at the intermediate and lower parts of Fig. 6. The unlocking of this mechanism is effected, when the cleaned bottles are in position to be discharged, by the engagement of the free end of lever 107 with a fixed stop 115 (Figs. 1 and 6) secured to the stationary ring 114.

The several pivoted bottle-carrying frames undergo various turning movements during the travel of each frame through the circle from the point at which it receives a row of soiled bottles to the same point where it receives the next row of soiled bottles; and it is essential to provide means for effecting and controlling these swinging or turning movements and for locking the frame in bottle-discharging and bottle-receiving positions. This mechanism will next be described.

Referring more particularly to Figs. 6, 7, and 8, 116 and 117 designate spring-actuated pins, formed at their outer ends with heads 116a and 117a, respectively, the pin 116 being slidably mounted in a suitable bearing formed in the hollow rotary disk 8, and the pin 117 being similarly mounted in a suitable bearing formed in a bracket 54 secured to the rotary hollow disk 8. The end bar 12 of the swiveled bottle-carrying frame is provided with a hole or socket 119 adapted to engage either of the pins 116, 117, as the frame swings on its trunnions. Figs. 3 and 6 show one of the frames locked in bottle-receiving position, in which the pin 116 is engaged with the hole or socket 119. As the frame moves around the axis of the rotary carrier, the head 116a of the pin engages a channeled cam 120 which retracts the pin, and allows the frame to swing by gravity toward the position in which the shot-boxes are uppermost. As the frame thus swings the socket 119 engages with the other pin 117, but this latter is thereupon retracted through the engagement of its head 117a with another cam 121 secured to the cam-disk 51, so that the frame is then free to assume a position which may vary between a vertical position in which the bottles are undermost and the inclined position shown at the top of Fig. 3. During this movement the valves of the shot-boxes are opened by the engagement of the pin 53 with the cam 52, and the water is turned on by the actuation of the controlling valves 17 by the springs 20; the pins 19 passing off a stationary cam segment 122 on each side of the machine, and thus allowing the springs to actuate the valves through the disks 18, it being understood that the cam segments 122 extend between the bottle-discharging and bottle-receiving positions so as to maintain the water cut off between these positions. The swinging frame, hanging free, then travels bodily around the axis of the rotary carrier, the water and shot operating to thoroughly scour and cleanse the bottles during this period of their travel. I have found in practice that under a high pressure of water accompanied by a very rapid flow the water exerts a tendency to drive the shot in a whirling spiral movement up into the shot-boxes and to some extent hold them in the latter. To allow the shot to fall back into the bottles I may provide a series of short periods of water cut off, which may be effected by short cam segments 122a operating to cut off the water for short periods through engagement with the pins 19 in the manner shown in connection with the cam segments 122.

As each bottle-carrying frame reaches and passes its lowermost position, traveling toward the point of discharge, the frame is swung to a vertical position in which the shot-boxes are lowermost, as indicated by dotted lines in Fig. 3 so as to cause the shot to all run down into the shot-boxes, and at about the same time the valve-actuating mechanism engages the lower end of the cam segment 122 and cuts off the water. The means for effecting the swinging movement of the frame comprises a friction gear 123 (Figs. 5, 6, 7 and 8) rotatably mounted on the bracket 10 and frictionally engaging the disk 13 that is fast with the frame. The friction gear 123 is adapted, as the frame approaches the discharge position, to frictionally engage a friction-block 124 secured to the stationary ring 114, whereby a turning movement of the friction gear 123 is caused, the same being transmitted to the disk 13 and bottle-carrying frame, thus inverting the same to the dotted line position shown in Fig. 3. In this position the shot fall into the shot-boxes, and immediately thereafter the ends of the rods 58 (Fig. 10) strike the free end of a pivoted trip 125 with sufficient force to release the catch 55, and permit the closing of the valves of the shot-boxes. Thereupon the frame being in an unstable position, swings back toward the reverse position, with the bottoms of the bottles downward during which swinging movement the locking-pin 116 is pulled out by a stationary cam 126, thus permitting the frame to swing to a point where it is engaged by the locking pin 117, thus locking the frame in discharging position shown in dotted lines in Fig. 6. The continued bodily movement of the swinging frame causes the engagement of the lever 107 of the outer clamp mechanism with the fixed stop 115, releasing the clamps 42 and allowing the bottles to be discharged from the machine. As the empty frame continues its upward movement (Fig. 6), and while the water is cut off by the engagement of the pin 19 with the cam segment 122, the locking pin 117 is withdrawn by engagement of its head 117a with a cam 127 (Fig. 7) mounted on the cam-supporting disk 51, and thereupon the friction gear 123 engages another friction-block 128, similar to the block 124, and mounted on the stationary ring 114, whereby the empty frame is swung into bottle-receiving position and automatically locked therein by the pin 116, ready to receive another row of soiled bottles.

The above described cycle of operations takes place successively with each of the several pivoted bottle-carrying frames shown which, it should be understood, are all alike and undergo the same movements.

The washed bottles are, in the complete and preferred organization of mechanism herein indicated, delivered to the underlying conveyer in which they are drained and from which they are finally discharged; said draining conveyer as herein shown comprising essentially a pair of sprocket-chains 129 (Fig. 9) suitably mounted and supporting between them bars or slats 130 on which are mounted pockets 131 into which the bottles are delivered neck foremost. To transfer the washed bottles from the washing machine proper to this draining conveyer I employ a bottle-guiding and inverting device best shown in Figs. 1, 2, 3, and 9. This device comprises an angle-frame 132 on each side of the machine frame opposite the point of discharge of the bottles and a hood-shaped member 133 between and supported by said angle-frames. The interior space of the hood 133 is divided by a series of parallel partitions 134 (Fig. 9) spaced apart approximately the width of a body of a bottle, and leading into the spaces between said partitions are slide-ways 135 extending through and from a suitable slot 136 (Fig. 9) cut in the circular shell 137 between the main circular side frame members 2. Secured to the partitions 134 and extending laterally thereof are guide-strips 138 which form between them narrow slots which will permit the passage of the neck portion of a bottle therethrough, these guide-strips 138 terminating short of the bottom of the hood 133 by about the length of the body and shoulder of the bottle. Hence, as the bottles fall into the hoods, they slide down until their bottoms strike the bottom of the hood, the neck portions at the same time fall through the narrow passages between the guide-strips 138, so that the bottle is inverted or turned neck downward during its fall. The inverted bottle then slides down over a chute 139 into the pocket 131 of the draining-conveyer.

Figure 1:
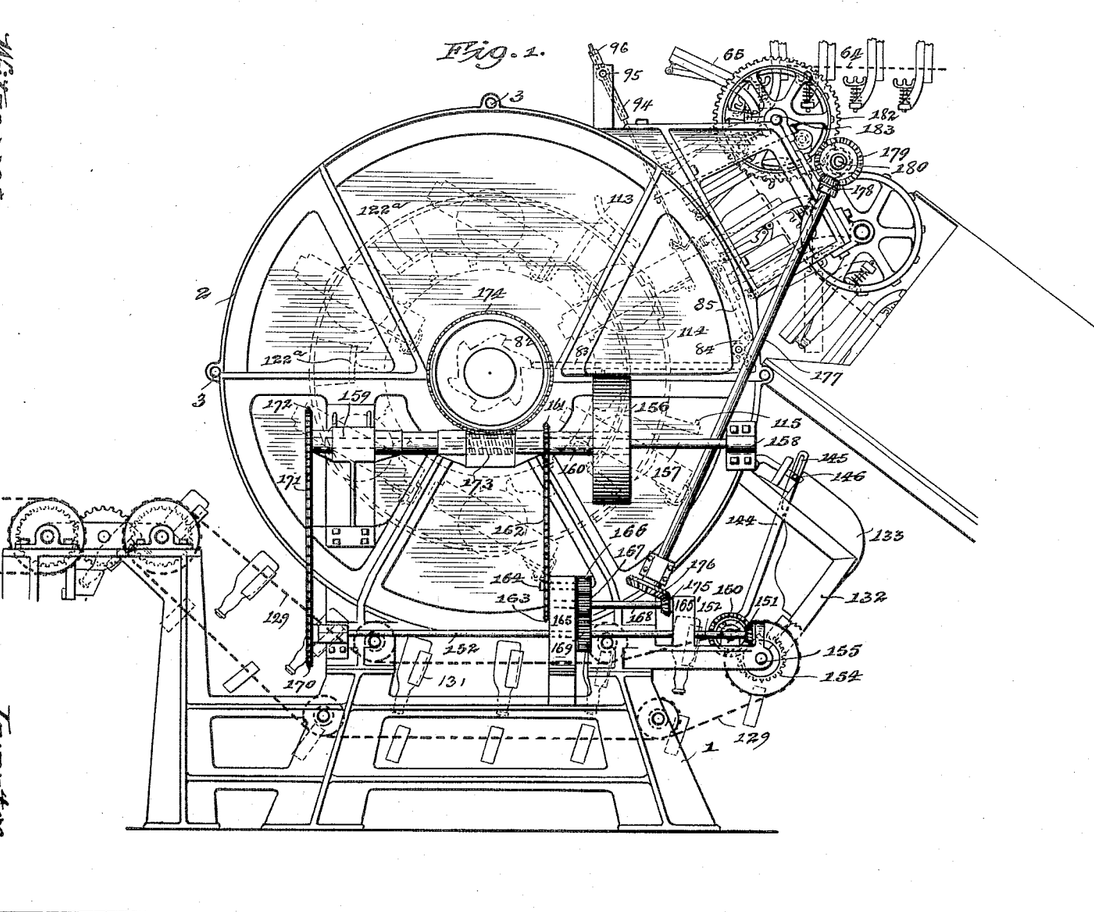
Figure 1 is a side elevational view of the machine, showing the means for applying power thereto, and also illustrating in fragmentary detail the conveyer for supplying soiled bottles to the machine and the draining conveyer which receives the washed bottles from the machine.

To insure the proper timing of the delivery of the washed bottles relatively to the travel of the draining-conveyer, I provide an arresting device at the receiving end of the bottle inverting hood; same comprising a transversely disposed strip 140 (Figs. 3 and 9) supported by and between the free ends of a pair of arms 141 hinged at 142 to lugs 143 mounted on the slide-way 135. The strip 140 normally forms a stop for the descent of the bottles, and it is raised at the proper time by an actuating-rod 144 (Figs. 1 and 9), the upper end of which has a slot 145 engaging a pin 146 projecting laterally from one of the arms 141. The lower end of the rod 144 is pivoted at 147 (Fig. 9) to a wrist-plate 148 mounted on a counter-shaft 149 journaled in the frame, said shaft 149 being driven through a beveled gear 150 thereon engaged and driven by a beveled pinion 151 fast on a way-shaft 152 (Fig. 1).

The shaft 149 also carries a spur-gear 153 (Fig. 9) meshing with and driving a spur-gear 154 fast on a sprocket-shaft 155 of the draining-conveyer.

Figure 4:
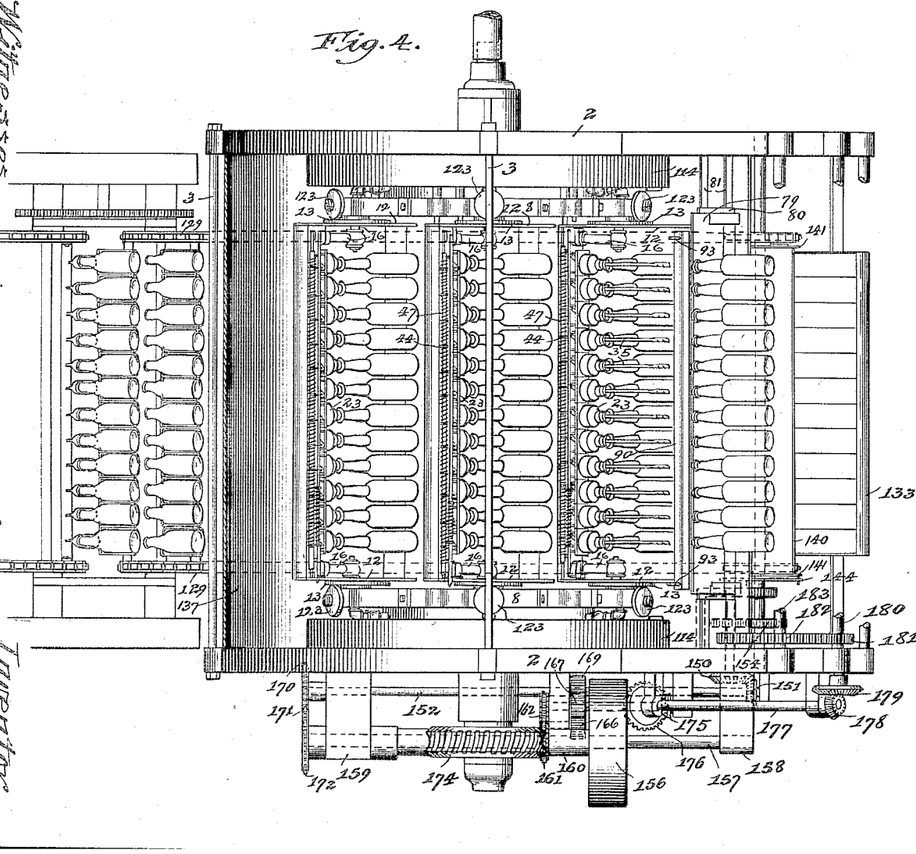
Fig. 4 is a top plan view partly in horizontal section of Fig. 1 with the fragmentary portion of the delivery conveyer of the latter figure omitted.

Power is applied to the machine from any suitable source through a pulley 156 (Figs. 1 and 4) turning loose on a shaft 157 journaled in bearings 158 and 159. A laterally extending hub 160 of the pulley 156 carries a sprocket 161 driving a sprocket chain 162 passing over a sprocket 163 fast on a stub-shaft 164 mounted in a bracket 165 supported on the base 1. On the other end of stub-shaft 164 is a spur-gear 166 driving a similar gear 167 fast on a counter-shaft 168 also journaled in the bracket 165 and a bracket 165', the gear 167 in turn driving a gear 169 fast on shaft 152. One end of shaft 152 carrries a sprocket 170 driving a sprocket chain 171 which engages and drives a sprocket 172 fast on a shaft 157. Keyed on the latter shaft is a worm 173 which drives a worm-wheel 174 fast on the hollow central shaft 5. From the counter-shaft 168 power is taken to drive the feeding-in-conveyer, the transmission herein shown comprising a beveled pinion 175 (Fig. 1) on shaft 168 driving a beveled pinion 176 on the lower end of an inclined way-shaft 177, the upper end of which carries a beveled pinion 178 (Fig. 4) driving a beveled gear 179 on a counter-shaft 180, the latter carrying a spur pinion 181 meshing with a driving and spur gear 182 fast on a sprocket-shaft 183 of the feeding-in-conveyer.

Figure 19:
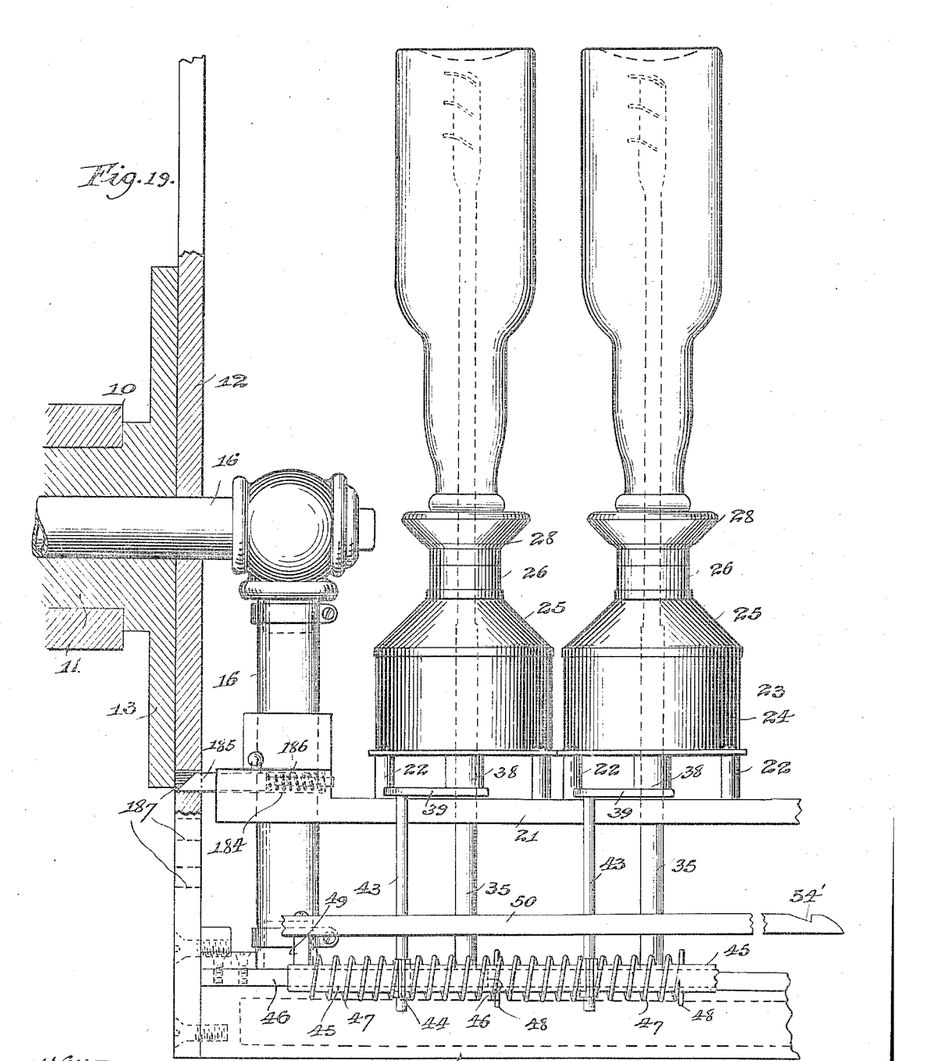
Fig. 19 is an elevation of a portion of a pivoted bottle-carrier showing a shot-box supporting bar adjustable to different lengths of bottles.

In Fig. 19 I show a construction wherein the bar 21 supporting the shot-boxes, instead of being permanently secured to end bars 12 of the bottle-carrying frame, is adjustably mounted on said bar so as to make the machine adjustable to bottles of varying lengths. In this construction the ends of the bar 21 are socketed as shown at 184 and slidably mounted therein are tenons 185 backed by springs 186 and adapted to engage in one of a series of holes 187 formed in or through the end bar 12 of the machine.

The operation of the machine has been indicated in connection with the description of its various parts and coöperating elements. The main rotary carrier carrying the series of pivoted bottle-supporting frames is continuously turned with a slow movement, the feeding in of soiled bottles and the discharge of washed bottles occurring without necessitating any stopping of the rotary carrier.

A feature of prime importance resides in the water injecting device whereby a jet or spray of water is injected within the bottle at high velocity in a direction oblique to the curved surface of the inner wall of the bottle, thereby setting up a rapid whirling action of the water and shot and driving the shot outwardly into effective scouring engagement with the walls of the bottle throughout the entire length of the latter. The main difficulty hitherto experienced in machines employing shot as a scouring agent has been to secure an effective frictional engagement of the shot with the walls of the bottle, the mere driving of the shot back and forth between the interior of the bottle and the shot-boxes or the mere rotation of the bottles on their own axes while containing the shot being ineffective for cleansing purposes. By my invention the shot are caused to thoroughly scour the walls of the bottle, and this is due to the peculiar manner in which the water is injected. To the extent that the water itself serves to scour the bottle, the described mode of injecting the water also renders it more effective than where the water is injected either directly longitudinally or radially of the injector-tube or nozzle, as heretofore.

It will be evident to those skilled in the art, that the mechanism as shown and described may be considerably modified and varied in respect to details of structure and relative arrangement of parts without involving any departure from the principle of the invention or sacrificing any of the advantages thereof. Hence, I do not limit the invention to the particular mechanism shown and described except to the extent clearly indicated in specific claims.

I claim:

1. In a bottle-washing machine, the combination of a rotary carrier journaled on a horizontal axis, a series of bottle-carrying frames pivotally mounted in said carrier on axes parallel with the axis of the latter, bottle clamps carried by said frames, and means for injecting a washing agent into the bottles when the latter are held by said clamps, substantially as described.

2. In a bottle-washing machine, the combination of a rotary carrier having a horizontal tubular axial shaft, a series of bottle-carrying frames pivotally mounted in said carrier on axes parallel with said axial shaft, bottle clamps carried by said frames, and means for supplying water from said tubular shaft internally to the bottles when the latter are held by said clamps, substantially as described.

3. In a bottle-washing machine, the combination of a rotary carrier having a horizontal tubular axial shaft, a series of bottle-carrying frames pivotally mounted in said carrier on axes parallel with said axial shaft, each of said frames including a hollow frame-bar provided with hollow clamps to engage the mouths of the bottles, clamps for engaging the bottoms of the bottles also mounted on said frame, and means for conducting water from said tubular shaft to the hollow frame-bar of each of said bottle-carrying frames, substantially as described.

4. In a bottle-washing machine, the combination of a rotary carrier having a horizontal tubular axial shaft, a series of bottle-carrying frames pivotally mounted in said carrier on axes parallel with said axial shaft, each of said frames including a hollow frame-bar provided with clamps to engage the mouths of the bottles and with injector tubes extending through said clamps and adapted to enter the bottles, clamps for engaging the bottoms of the bottles also mounted on said frame, and means for conducting water from said tubular shaft to the hollow frame-bar of each of said bottle-carrying frames, substantially as described.

5. In a bottle-washing machine, the combination of a rotary carrier, a series of bottle-carrying frames pivotally mounted substantially in the line of their longitudinal axes in said carrier, bottle clamps carried by said frames, means for injecting a washing agent into the bottles when the latter are held by said clamps, and means for locking said frames against turning movement when in their bottle-receiving and discharging positions, substantially as described.

6. In a bottle-washing machine, the combination of a rotary carrier, a series of bottle-carrying frames pivotally mounted substantially in the line of their longitudinal axes in said carrier, bottle clamps carried by said frames, means for injecting a washing agent into the bottles when the latter are held by said clamps, means for automatically locking said frames against turning movement when in their bottle receiving and discharging positions, and means for automatically unlocking said frames as they move from their bottle receiving and discharging positions, substantially as described.

7. In a bottle-washing machine, the combination of a rotary carrier, a series of bottle-carrying frames pivotally mounted substantially in the line of their longitudinal axes in said carrier, bottle clamps carried by said frames, means for injecting a washing agent into the bottles when the latter are held by said clamps, and means for automatically swinging said frames to different bottle receiving and discharging positions during the turning movement of said rotary carrier, substantially as described.

8. In a bottle-washing machine, the combination of a rotary carrier, a series of bottle-carrying frames pivotally mounted substantially in the line of their longitudinal axes in said carrier, bottle clamps carried by said frames, means for injecting a washing agent into the bottles when the latter are held by said clamps, means for automatically swinging said frames to different bottle receiving and discharging positions during the turning movement of said rotary carrier, means for automatically locking said frames against turning movement when in their bottle receiving and discharging positions, and means for automatically unlocking said frames as they move from their bottle receiving and discharging positions, substantially as described.

9. In a bottle-washing machine, the combination of a rotary carrier, a series of bottle-carrying frames mounted therein, each of said frames being provided with bottle clamps and with injector tubes adapted to enter the bottles, means for supplying water to said injector tubes, a conveyer for soiled bottles, and a guide to direct the mouths of the bottles from said conveyer over the tips of said injector tubes, substantially as described.

10. In a bottle-washing machine, the combination of a rotary carrier, a series of bottle-carrying frames mounted therein, each of said frames being provided with bottle clamps and with injector tubes adapted to enter the bottles, means for supplying water to said injector tubes, a conveyer for soiled bottles, and a pivoted frame carrying a series of bell-mouthed guides adapted to receive and center the mouths of the bottles as they are delivered from said conveyer and direct them over the tips of said injector tubes, substantially as described.

11. In a bottle-washing machine, the combination of a rotary carrier, a series of bottle-carrying frames mounted therein, each of said frames being provided with a series of clamps engaging the bottoms of the bottles, means for supplying water to the interior of the bottles, a draining device, means for automatically releasing said clamps when the bottles reach discharging position, and a guide serving to invert the bottles as they are delivered from said bottle-carrying frames and direct them mouth downward into said draining device, substantially as described.

12. In a bottle-washing machine, the combination with a bottle-holder, of a vertical injector tube adapted to enter the bottle and provided with a closed end and a lateral discharge orifice, the portion of the tube containing said discharge orifice being laterally offset relatively to the main portion of the tube, and said discharge orifice being so disposed as to direct the jet obliquely in a substantially horizontal plane against the inner wall of the bottle, substantially as described.

13. In a bottle-washing machine, the combination with a bottle-holder, of an injector tube adapted to enter the bottle and provided with a laterally off-set flattened free end portion formed with a discharge orifice in one edge thereof so disposed as to direct the jet obliquely against the inner wall of the bottle, substantially as described.

14. In a bottle-washing machine, the combination with a shot-box and a guide-sleeve therein having a valve aperture, of a clamp adapted to engage the mouth of a bottle and provided with a valve-like stem telescoping said guide-sleeve, said stem having a port adapted to move into and out of register with the aperture of said guide-sleeve under relative longitudinal movement of said telescoping parts, substantially as described.

15. In a bottle-washing machine, the combination with a shot-box and a guide-sleeve therein having a valve aperture, of a clamp adapted to engage the mouth of a bottle and provided with a valve-like stem telescoping said guide-sleeve, said stem having a port adapted to register with the aperture of said guide-sleeve when said clamp is in its innermost position relatively to the shot-box, and a spring normally urging said clamp to its outermost position wherein said aperture and port are out of register, substantially as described.

16. In a bottle-washing machine, the combination with a shot-box and a guide-sleeve therein having a valve aperture, of a clamp adapted to engage the mouth of a bottle and provided with a valve-like stem telescoping said guide-sleeve, said stem having a port adapted to register with said guide-sleeve when said clamp is in its innermost position relatively to the shot-box, a spring normally urging said clamp to its outermost position, and means for effecting a relative turning movement between said guide-sleeve and clamp-stem, whereby said aperture and port may be brought into and out of register by either a relative longitudinal or a relative turning movement between said guide-sleeve and clamp-stem, substantially as described.

17. In a bottle-washing machine, the combination of a hollow bar adapted to be supplied with water, an injector tube mounted on and communicating with said hollow bar, a shot-box mounted on said bar and containing an apertured guide-sleeve, a clamp adapted to engage the mouth of a bottle and provided with a ported stem telescoping said guide-sleeve and slidingly engaging said injector-tube, a spring normally urging said clamp to its outermost position, and means for effecting a relative turning movement between said guide-sleeve and clamp stem, substantially as described.

18. In a bottle-washing machine, the combination of a rotary carrier journaled on a horizontal axis, a series of bottle-carrying frames mounted therein on axes parallel with the axis of said carrier; each of said frames including a hollow frame bar provided with clamps to engage the bottles and with injector tubes adapted to enter the latter, water delivery pipes leading into said hollow frame bars, valves in said pipes, and means for automatically closing the valve of each of said water delivery pipes during the travel of the bottle-carrying frame pertaining thereto between the bottle discharging and receiving positions of said frame, substantially as described.

19. In a bottle-washing machine, the combination of a rotary carrier, a series of bottle-carrying frames mounted therein; each of said frames including a hollow frame bar provided with clamps to engage the bottles and with injector tubes adapted to enter the latter, water delivery pipes leading into said hollow frame bars, valves in said pipes, springs normally acting to maintain the said valves in open position, and a cam segment engaging and closing said valves during the travel of the respective bottle-carrying frames served thereby between their bottle-discharging and receiving positions.

GEORGE B. KEPLINGER.

Witnesses:
SAMUEL N. POND,
DAISY C. THORSEN.